United States Patent [19]

Cross et al.

[11] 4,284,729
[45] Aug. 18, 1981

[54] PROCESS FOR COLORING THERMOSETTING RESINS

[75] Inventors: John P. Cross; George H. Britton, Jr., both of Spartanburg, S.C.

[73] Assignee: Milliken Research Corporation, Spartanburg, S.C.

[21] Appl. No.: 135,402

[22] Filed: Mar. 31, 1980

[51] Int. Cl.$^3$ .............................................. C08G 18/14
[52] U.S. Cl. .................................. 521/158; 521/166; 521/167; 528/52; 528/53; 528/73; 528/74; 528/78; 528/93; 528/94; 528/110; 528/111; 528/289; 528/291
[58] Field of Search ............... 521/115, 116, 158, 166, 521/167; 528/52, 53, 73, 74, 78, 93, 94, 110, 111, 289, 291; 260/37 N, 37 EP

[56] References Cited

U.S. PATENT DOCUMENTS

| | | | |
|---|---|---|---|
| 3,137,671 | 6/1964 | Bosshand et al. | 521/166 |
| 3,219,697 | 11/1965 | Cox et al. | 8/115.5 |
| 3,236,582 | 2/1966 | Ueda et al. | 8/4 |
| 3,248,371 | 4/1966 | Damusis | 260/32.4 |
| 3,255,253 | 6/1966 | Kuryla | 521/167 |
| 3,368,985 | 2/1968 | Wismer et al. | 521/131 |
| 3,714,079 | 1/1973 | Wilson et al. | 528/73 |
| 3,880,797 | 4/1975 | Maeda et al. | 260/37 N |
| 3,993,619 | 11/1976 | Kruckenberg et al. | 260/37 N |
| 3,994,835 | 11/1976 | Wolf et al. | 521/166 |
| 4,026,931 | 5/1977 | Wiesel et al. | 260/37 N |
| 4,038,240 | 7/1977 | Hugl et al. | 260/37 N |
| 4,132,840 | 1/1979 | Hugl et al. | 521/167 |
| 4,137,213 | 1/1979 | Kempten et al. | 528/111 |
| 4,141,684 | 2/1979 | Kuhn | 8/39 R |
| 4,166,163 | 8/1979 | Di Bella et al. | 521/116 |

OTHER PUBLICATIONS

Allen et al., "Internally Coloned Polymers", *Encyclopedia of Polymer Science & Technology*, vol 15, John Wiley, NY, 1971, pp. 314-319.

*Primary Examiner*—Maurice J. Welsh
*Attorney, Agent, or Firm*—H. William Petry; Terry T. Moyer

[57] ABSTRACT

A process is provided for coloring thermosetting resins, made by polyaddition reaction of a nucleophile with an electrophile, with a polymeric liquid reactive coloring agent suitable for incorporation in the resin with the formation of covalent bonds, said coloring agent having the formula:

R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polyeric constituent has a molecular weight of from about 44 to about 1500; and n is an integer of from 1 to about 6; and X is selected from —OH, —NH$_2$ and —SH, said coloring agent being added in an amount sufficient to provide coloration of said thermosetting resin.

12 Claims, No Drawings

PROCESS FOR COLORING THERMOSETTING RESINS

This invention relates to a process for preparing colored thermosetting resins made by a polyaddition reaction between a nucleophile and an electrophile and to products of such a process.

It is known that thermosetting resins, such as polyurethanes, epoxies and even polyester, made by the reaction of a nucleophilic group with an electrophilic group may be colored principally by adding a pigment or dye to the resin. However, when certain thermosetting material such as polyurethanes or epoxies are colored with a pigment, the resulting product may be only slightly tinted at normal pigment concentrations and may require relatively larger and undesirable amounts of pigment where a dark hue is desired. This phenomena is particularly apparent in the case of polyurethane foams. On the other hand, if a dye is used to color the product, the water resistance, oil resistance, resistance to migration or the like of the product may often be disadvantageously inadequate. When a dye is used as the coloring agent, it is difficult to prevent bleeding of the dye from the colored thermoset resin product. However, thermosetting resin products such as polyurethanes, which have been colored with a dye, have certain advantages, namely, they may, for instance, possess a clearer hue and improved transparency characteristics.

Dyes, rather than pigments, also would be the preferred method of coloring thermosetting resins because each molecule of the dye can impart color to the product while only the molecules on the surface of a pigment particle impart color. From the standpoint of utilization, then, dyes are more effective than pigments; however, because of the shortcomings of dyes, discussed above, pigments have been used extensively.

A need, therefore, exists for a coloring agent which has excellent water resistance, oil resistance and/or bleeding resistance and which at the same time may be easily incorporated into the resin product in liquid form. Accordingly, it would be highly desirable to provide a process for preparing colored thermosetting resin products in which the coloring agent has the foregoing advantages. Briefly, the present invention combines the very desirable characteristics of high color yields of dyes with the non-migratory properties of pigments which results, overall, in a product which is superior to both in terms of cost effectiveness and properties of the cured polymer system. The present invention provides a process whereby the above advantages may be achieved as will hereinafter become more apparent.

According to the present invention a process is provided for coloring thermoset resins made by the polyaddition reaction in a reaction mixture of a nucleophile with an electrophile, which comprises adding to the reaction mixture before or during the polyaddition reaction a polymeric liquid reactive coloring agent suitable for incorporation in the resin with the formation of covalent bonds, said coloring agent having the formula:

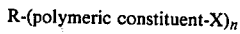

R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; and $n$ is an integer of from 1 to about 6; and X is selected from —OH, —NH$_2$ and —SH, said coloring agent being added in an amount sufficient to provide coloration of said thermosetting resin.

The colorants used in the process of the present invention are liquid materials at ambient conditions of temperature and pressure. The dyestuff radical of the liquid colorants may vary widely, depending to a large extent upon the desired color and properties of the final polymeric product. Preferably, the organic dyestuff radical is attached to the polymeric constituent with an amino nitrogen. Examples of dyestuff radicals include nitroso, nitro, azo, including monoazo, diazo, and triazo, diarylmethane, triarylmethane, xanthene, acridene, methine, thiazole, indamine, azine, oxazine, or anthraquinone dyestuff radicals. Particularly useful in the preparation of the liquid colorants of the invention are the azo, anthraquinone and triarylmethane dyestuff radicals.

The polymeric constituent of the colorants used in the process of the invention may be any suitable polymeric constituent which renders the resulting colorant liquid. Typical of such polymeric constituents which may be attached to the dyestuff radical are the polymeric epoxides, such as the polyalkylene oxides and copolymers thereof. Typical polyalkylene oxides and copolymers of same which may be employed to provide the liquid colorant of the present invention are polyethylene oxides, polypropylene oxides, polybutylene oxides, copolymers of polyethylene oxides, polypropylene oxides and polybutylene oxides, and other copolymers including block copolymers, in which a majority of the polymeric constituent is polyethylene oxide, polypropylene oxide and/or polybutylene oxide. Further, such polymeric constituents may have an average molecular weight in the range of from about 44 to about 1500, preferably from about 80 to about 800.

Any suitable procedure may be employed to produce the liquid colorants of the invention whereby the polymeric constituent, or constituents, are coupled to an organic dyestuff radical. For example, the procedure set forth in U.S. Pat. No. 3,157,633, hereby incorporated by reference, may be employed. Further, it may be desirable to use an organic solvent as the reaction medium since the polymeric constituent is preferably in solution when coupled to the organic dyestuff radical. Any suitable organic solution, even an aqueous organic solution, may be employed. The particular shade of the colorant will depend primarily upon the particular dyestuff radical selected. A large variety of colors and shades may be obtained by blending two or more colorants. Blending of the liquid colorants of the present invention can be readily accomplished as the colorants are polymeric material having substantially identical solubility characteristics, which are dictated by the nature of the polymeric chain. Therefore, the polymeric colorants are in general soluble in one another, and are also in general completely compatible with each other.

For example, the liquid colorants of the invention may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides, such as ethylene oxide, propylene oxide, or even butylene oxide, according to procedures well known in the art, and then coupling the resulting compound with a diazonium salt of an aromatic amine. In order to prepare liquid colorants of the triarylmethane class, aromatic amines that have been reacted as stated above with an alkylene oxide are condensed with aromatic aldehydes and the resulting condensation products oxidized to form the triarylmethane liquid colorants. While azo, triphenylmethane and anthraquinone liquid colorants are preferred because of their ease of preparation and brilliance of color as well as the multitude of shades available, many other liquid colorants may be prepared by known procedures.

According to the process of the invention, the liquid colorant may be incorporated into the resin by simply adding it to the reaction mixture or to one of the components of the reaction mixture before or during the polyaddition reaction. For instance, when the thermosetting resin to be colored is a polyurethane resin the process may be carried out by adding a coloring agent of the formula

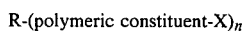

R-(polymeric constituent-X)$_n$ in the form of a liquid to the polyol or even in some instances to the polyisocyanate component of the reaction mixture either before or during polyurethane formation. The subsequent reaction may be carried out in the usual manner, i.e., in the same way as for polyurethane resins which are not colored. Details about this procedure may be found in the relevant literature.

The coloring agents used in the process of the present invention are polymeric, liquid, reactive coloring agents. Thus, they may be added to the reaction mixture or to one of the components thereof in solvent-free form rather than in the form of solutions or dispersions in a suitable solvent or dispersing medium as has been heretofore proposed in the art, see for example U.S. Pat. Nos. 4,038,240, 4,026,931 and 3,993,619. While in these prior art patents there is covalent bond formation, there is no suggestion that the coloring agent may be a liquid at ambient temperatures and pressures. Obviously liquids have significant processing advantages over solids, and moreover liquids of the present invention may, if desired, be added directly to the reaction mixture and therefore contain no extraneous nonreactive solvent or dispersing agent. This process may, therefore, provide unusual and advantageous properties in the final thermoset resin product. Alternatively, however, the coloring agent may be premixed with minor amounts of one or more of the precursors of the polymeric product, thus providing certain processing advantages.

The thermosetting resins to which the process of the present invention may be applied may be made by the reaction of a nucleophile with an electrophile. Examples of such resins include alkyds, allylics, the aminos, e.g., melamine and urea, epoxies, phenolics, polyesters, silicones and urethanes. The thermosetting resin to be colored according to the process of the present invention can be used in a variety of different end uses, e.g., as moldings, sealants, elastomers, films, fibers, lacquers, coating and foamed materials. It has been found in particular that the process of the present invention may quite advantageously be employed for the production of foams, such as polyurethane foams. Polyurethane foams colored according to the process of the present invention may be soft, semi-rigid or rigid foams, or the so-called polyurethane integral skin and microcellular foams.

Polyurethane products which may be colored according to the process of the present invention are useful for producing shaped products by injection molding, extrusion or calendering and may be obtained by adding the liquid coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The coloring agent may also be admixed with the so-called chain extending diols, e.g., ethylene glycol, diethylene glycol and butane diol. In general, it is desirable not to use more than about 20 percent by weight of coloring agent based on the weight of polyol. In most cases very strong colorations are produced with a small proportion of the coloring agent, for example, from about 0.1 to about 2 percent, preferably 0.5 to 1 percent by weight liquid coloring agent based on the weight of polyol.

Because the colorants used in the process of the invention are, in themselves, polymeric compounds, they may be soluble, for instance, in most polyols which would be used in polyurethanes, in most epoxy formulations, in polyester formulations and in themselves. This property may be particularly valuable for three reasons. First, this solubility may permit rapid mixing and homogeneous distribution throughout the resin, thus eliminating shading differences and streaks when properly mixed. Second, the colorant may have no tendency to settle as would be the case with pigment dispersions. Third, it is possible to prepare a blend of two or more colors which provides a wide range of color availability.

The prior art describes the use of numerous pigment dispersions as being useful for imparting color to thermosetting resins. These may be somewhat abrasive and may be damaging to the machinery used for producing thermosets, especially if an undiluted dispersion is being pumped through a mechanism wherein close mechanical tolerances must be maintained to ensure proper operation. The liquid reactive colorants of the present invention do not have any solids and, therefore, may flow through machinery with little or no wear on the surfaces.

The liquid reactive coloring agents used in the process may also be of considerable value in reaction injection molding (RIM) applications. The RIM process is a method of producing molded urethanes and other polymers wherein the two reactive streams are mixed while being poured into a mold. Upon reaction, the polymer is "blown" by chemicals to produce a foam structure. This process may be hindered by the presence of solid particles, such as pigments. The present invention may not cause this hindrance because there are no particles in the system and the colorant becomes part of the polymer through reaction with one of the components.

The following examples illustrate the invention, the parts and percentages, also otherwise illustrated are all by weight:

PREPARATION I

Ethylene oxide was bubbled into warm aniline under nitrogen until two molar equivalents of ethylene oxide were consumed. There was thus produced N,N-dihydroxyethylaniline, which solidified on cooling to room temperature.

Similarly, meta-toluidine was treated with ethylene oxide producing N,N-dihydroxyethyl-m-toluidine.

PREPARATION II

Five hundred forty-three grams (3 moles) of N,N-dihydroxyethylaniline and 2.5 grams potassium hydroxide were placed in a 2 liter stainless steel pressure reactor equipped with an agitator, gas inlet tube and vent. After purging with nitrogen, the reactor and contents were heated to 100° C. under vacuum and held on temperature for 0.5 hours. The vacuum was broken with nitrogen and the reactor was heated to 150° C. Ethylene oxide was added through the inlet tube until eight equivalents were consumed. After post reacting for 30 minutes, the mixture was subjected to vacuum for 30 minutes, then cooled to room temperature. The thus produced intermediate:

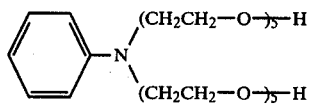

was an amber, freeflowing liquid.

PREPARATION III

The method of Preparation III was followed, using N,N-dihydroxyethyl-m-toluidine and enough ethylene oxide to add eight moles. The product was the formula:

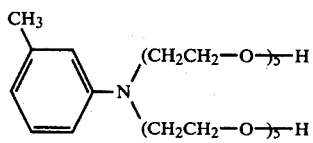

and was a liquid at room temperature.

EXAMPLE I

To a 2 liter glass reactor was charged aniline (47.9 grams, 0.52 moles), which was cooled to 0° C. Hydrochloric acid (161 grams) was added dropwise with stirring, and the resulting mixture cooled to 0° C. Sodium nitrite (40.3 grams, 0.58 moles) was dissolved in water (80 milliliters) and added dropwise to the aniline solution while maintaining the temperature below 5° C. When addition was complete, the mixture was stirred for 30 minutes and excess nitrite was confirmed by starch-iodide paper. Sulfamic acid was added in portions until excess nitrite was consumed.

In another reactor, the intermediate of Preparation III (282 grams, 0.52 moles) was charged. A solution of sodium acetate (29.6 grams, 0.36 moles) in water (51 milliliters) was prepared. The previously prepared aniline diazonium solution was added in portions using the sodium acetate solution to maintain the pH of the coupling bath at 4–5. Temperature was maintained below 10° C. The mixture was post-stirred for one hour after addition of diazonium salt was complete.

The mixture was poured into a beaker and heated to 95° C. on a steam bath. The colorant phased out, formed a layer on top and was decanted. The thus isolated material, a dark liquid, was treated with an equal volume of water and heated to 95° C. whereupon phasing again occurred, this time the colorant formed a layer on the bottom. The aqueous layer was decanted and discarded. The colorant was again treated with water and phased, discarding the aqueous layer.

After stripping under high vacuum to 99.4 percent solids, a yellow colorant was obtained:

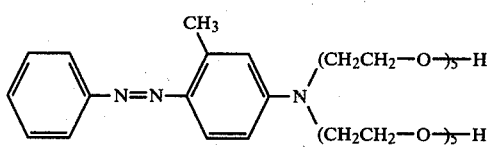

EXAMPLE II

In a manner similar to Example I, aniline and the ethoxylated intermediate of Preparation II were coupled giving a yellow colorant of the structure:

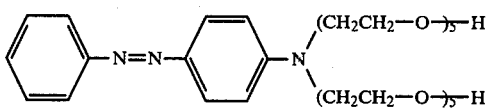

EXAMPLE III

In a manner similar to Example I, 2-amino-5-nitroanisole and the intermediate of Preparation III were coupled giving a red colorant:

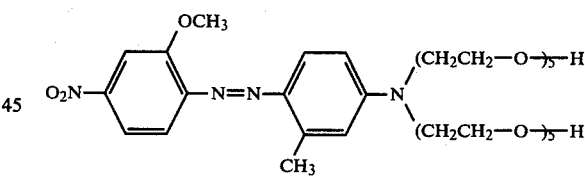

EXAMPLE IV

Using the methods described in U.S. Pat. No. 4,137,243, a colorant was prepared from quinizarin and a diamine of molecular weight 230 derived from a polypropylene oxide. The resulting viscous blue colorant has the structure:

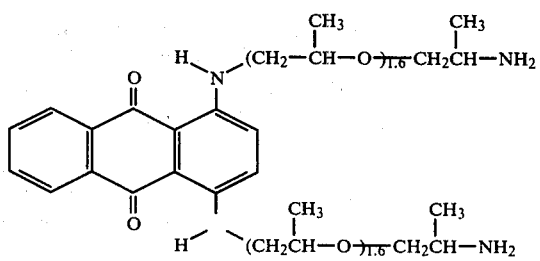

EXAMPLE V

Using standard procedures, 2-amino-6-methoxybenzothiazole was diazotized with nitrosylsulfuric acid and coupled with the intermediate of Preparation III at a pH of 2. After a procedure similar to that of Example I, a red colorant was obtained:

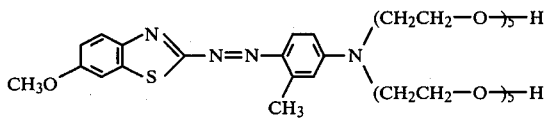

EXAMPLE VI

Example of Incorporation into a Flexible Polyester Polyurethane Foam

To a mixture of a polyester polyol of hydroxyl number 46 (100 grams), water (3.6 grams), a silicone based emulsifier (1.3 grams), stannous octoate (0.4 grams) and tertiary amine catalyst (0.3 grams) was added 0.1 gram (0.1 php) of the yellow single component liquid reactive coloring agent of Example I. The mixture was stirred for 30 seconds to ensure a homogeneous mixture. Toluene diisocyanate (45.7 grams) was added and mixing continued for 5 seconds whereupon the foam began to rise. After foam rise was completed (about 3 minutes), the foam was post-cured for 8 minutes in a 120° C. oven. The thus produced foam was butter yellow in color.

EXAMPLE VII

Incorporation into a Polyurethane Film

A urethane prepolymer was prepared from 104 grams of a polypropylene glycol of molecular weight 2000, 22.5 grams of toluene diisocyanate, 3.2 grams of the red coloring agent of Example III. To 30 grams of the prepolymer was added 7 drops of dibutyltin dilaurate and the resulting mixture was cast as a 40 mil film on polytetrafluoroethylene. After curing at room temperature overnight, a tough, flexible, deep red film was obtained.

EXAMPLE VIII

Incorporation into an Epoxy

To a mixture of 68 grams of an epoxy resin derived from bis-phenol A with weight per epoxy of about 185 to 192, 54 grams of methyltetrahydrophthalic anhydride and 0.66 grams of a tertiary amine catalyst was added 1 drop of the blue coloring agent of Example IV. After curing at 110° C., a clear blue resin was obtained.

EXAMPLE IX

Example of Incorporation into a Polyester Polyurethane Foam

A mixture of a polydiethylene adipate (equivalent weight 1066, 50 grams), N-ethylmorpholine (0.9 grams), N,N-dimethylhexadecylamine (0.05 grams), a mixture of nonionic and anionic surfactants and the colorant of Example I (0.25 grams) was blended until the components were homogeneous. To this mixture was added toluene diisocyanate (22.9 grams) and mixing continued for 5 seconds. The mixture was poured into a container and allowed to rise forming a yellow flexible urethane foam.

EXAMPLE X

Example of Incorporation into a Reaction Injection Molding (RIM) Formulation

A mixture was prepared of an acrylonitrile and styrene modified polyol (equivalent weight 2000, 42.5 grams), a mixture of short diols (equivalent weight 48, 7.5 grams), methylene chloride (1.0 grams), dibutyltin dilaurate (1 drop) and 0.25 grams of the colorant of Example V. The mixture was blended until homogeneous. To this mixture was added a modified diphenylmethane diisocyanate (equivalent weight 147, 26.6 grams) and blending continued for 5 seconds to ensure homogeneity. After approximately 15 seconds the mixture rapidly tripled its volume and cured. The thus formed polymer was deeply violet in color. Upon slicing, it was evident that the color was distributed evenly throughout the structure.

What is claimed is:

1. A process for coloring thermosetting resins, made by the polyaddition reaction in a reaction mixture of a nucleophile with an electrophile, which comprises adding to the reaction mixture before or during the polyaddition reaction a polymeric liquid reactive coloring agent suitable for incorporation in the resin with the formation of covalent bonds, said coloring agent having the formula:

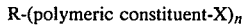

wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; and $n$ is an integer of from 1 to about 6; and X is selected from —OH, —NH$_2$ and —SH, wherein the organic dyestuff radical and polymeric constituent are selected so as to provide said coloring agent in the liquid phase at ambient conditions of temperature and pressure; said coloring agent being added in an amount sufficient to provide coloration of said thermosetting resin.

2. The process of claim 1 wherein said thermosetting resin is a polyurethane.

3. The process of claim 2 wherein said polyurethane is a foamed polyurethane.

4. The process of claim 1 wherein said thermosetting resin is an epoxy.

5. The process of claim 1 wherein said thermosetting resin is a polyester.

6. The process of claim 1 wherein said organic dyestuff radical is selected from azo, anthraquinone and triarylmethane dyestuff radicals.

7. A colored thermoset resin which comprises the reaction product of a nucleophile and an electrophile and which further has incorporated in said resin a covalently bound coloring agent having the formula

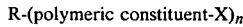

wherein R is an organic dyestuff radical, the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500, and $n$ is an integer of from 1 to about 6, and X is selected from —OH, —NH$_2$ and —SH, said coloring agent being incorporated into said resin in an amount sufficient to provide coloration of said resin.

8. The resin of claim 7 wherein said resin is a polyurethane.

9. The resin of claim 8 wherein said polyurethane is a foamed polyurethane.

10. The resin of claim 7 wherein said resin is an epoxy.

11. The resin of claim 7 wherein said resin is a polyester.

12. The resin of claim 7 wherein said organic dyestuff radical is selected from azo, anthraquinone and triarylmethane dyestuff radicals.

* * * * *

UNITED STATES PATENT OFFICE
CERTIFICATE OF CORRECTION

Patent No. 4,284,729     Dated August 18, 1981

Inventor(s) John P. Cross and George H. Britton, Jr.

It is certified that error appears in the above-identified patent and that said Letters Patent are hereby corrected as shown below:

ON THE TITLE PAGE:
    In the Abstract, line 12, change "polyeric" to --polymeric--.

Column 6, Example IV, change the formula to

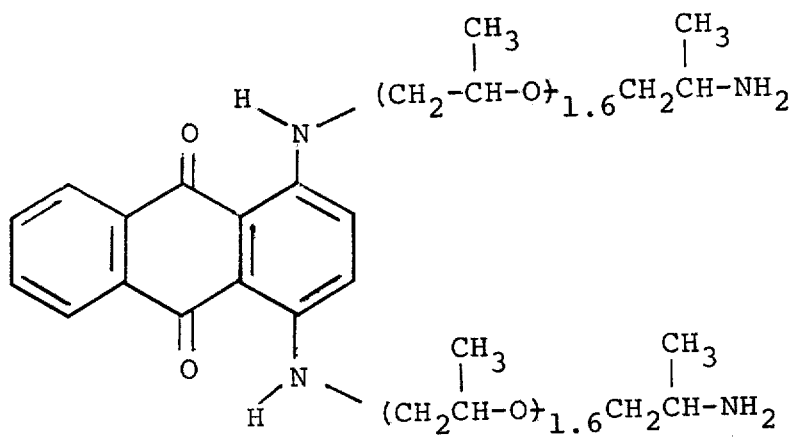

Signed and Sealed this

Thirteenth Day of April 1982

[SEAL]

Attest:

GERALD J. MOSSINGHOFF

Attesting Officer    Commissioner of Patents and Trademarks